Phase Equilibrium Diagram for the System
r-R₁₆Br + n-R₁₆H + Nitroethane
at 28°C. and 1 Atmosphere
(Weight Basis)

Phase Equilibrium Diagram for the System
$r-R_{16}Cl + n-R_{16}H$ + Nitroethane
at 35°C. and 1 Atmosphere
(Weight Basis)

Phase Equilibrium Diagram for the System
$r$-$R_{18}Cl$ + $n$-$R_{18}H$ + Nitroethane
at 35°C. and 1 Atmosphere
(Weight Basis)

United States Patent Office 3,553,275
Patented Jan. 5, 1971

3,553,275
SOLVENT EXTRACTION PROCESS FOR EXTRACTING LONG CHAIN ALKYL MONOHALIDES FROM LONG CHAIN ALKANES
Kamlesh Kumar Bhatia, Gainesville, Fla., assignor to The Procter & Gamble Company, Cincinnati, Ohio, a corporation of Ohio
Filed Jan. 10, 1968, Ser. No. 696,884
Int. Cl. C07c 17/38
U.S. Cl. 260—652                                  7 Claims

ABSTRACT OF THE DISCLOSURE

Process for separating long chain alkyl monohalides (chlorides or bromides) from the corresponding alkanes having chain lengths of from about 12 to about 24 carbon atoms comprising the step of mixing a solvent selected from the group consisting of propionitrile, nitroethane, and mixtures of acetone and methanol having ratios of acetone to methanol of from about 2:1 to about 9:1 with a mixture of said monohalides and alkanes to form an extract phase rich in said monohalides and a raffinate phase rich in said alkanes.

(A) FIELD OF THE INVENTION

This application relates to solvent extraction processes for the separation of long chain alkyl monohalides from the corresponding alkanes. Specifically this application relates to the discovery that certain specific solvents have a good selectivity for the said alkyl monohalides as opposed to the corresponding alkanes. The solubility of said monohalides in these solvents and the differences in solubility between said monohalides and said alkanes are sufficiently large that an economical process of separation is possible

(B) PRIOR ART

Although some processes for the separation of long chain alkyl monohalides from the corresponding alkanes are known such as the one disclosed in U.S. Pat. 3,259,664, the difficulties of obtaining an economical separation still remain. The long chain alkyl monohalides are not sufficiently soluble in the solvent of U.S. Pat. 3,259,644 (liquid $SO_2$) to enable one to economically separate said monohalides from said alkanes.

It is an object of this invention to provide a solvent extraction process for the separation of long chain alkanes and the monohalogenated derivatives thereof.

Figure 1:
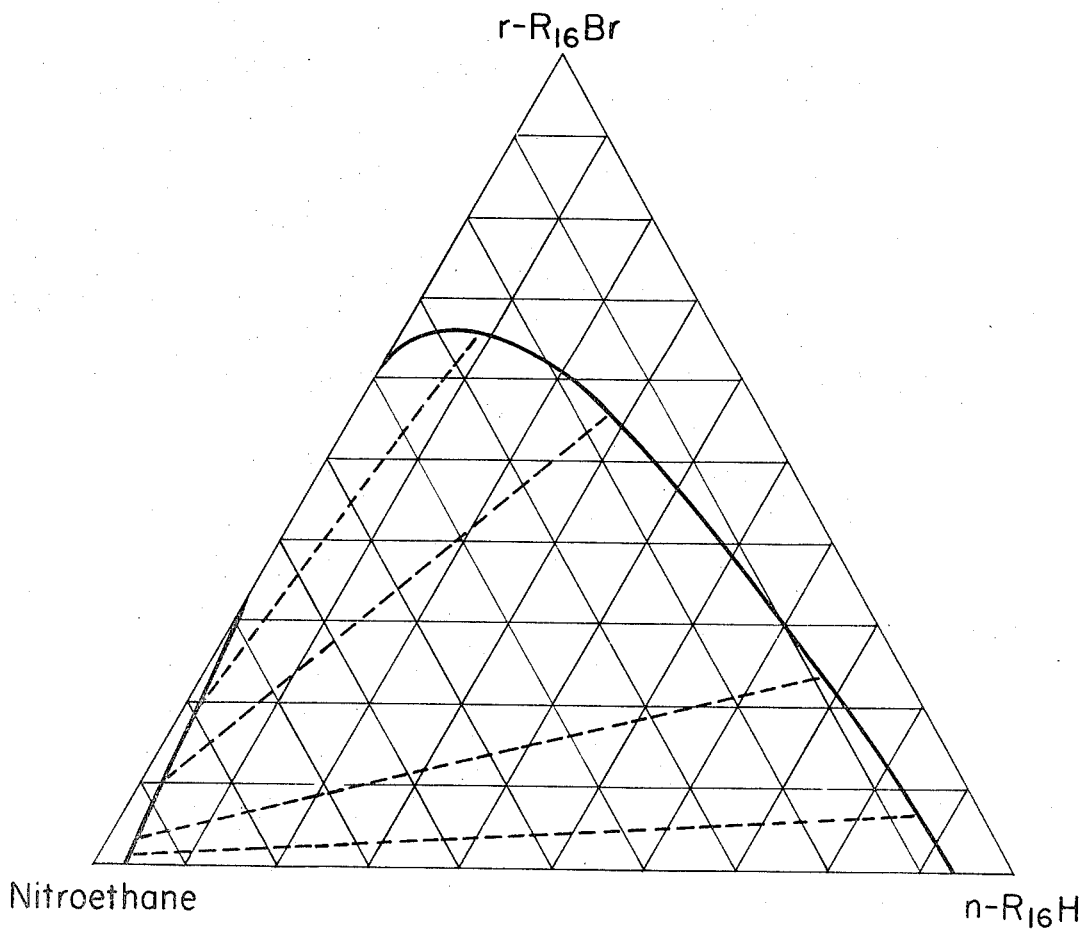
Figure 2:
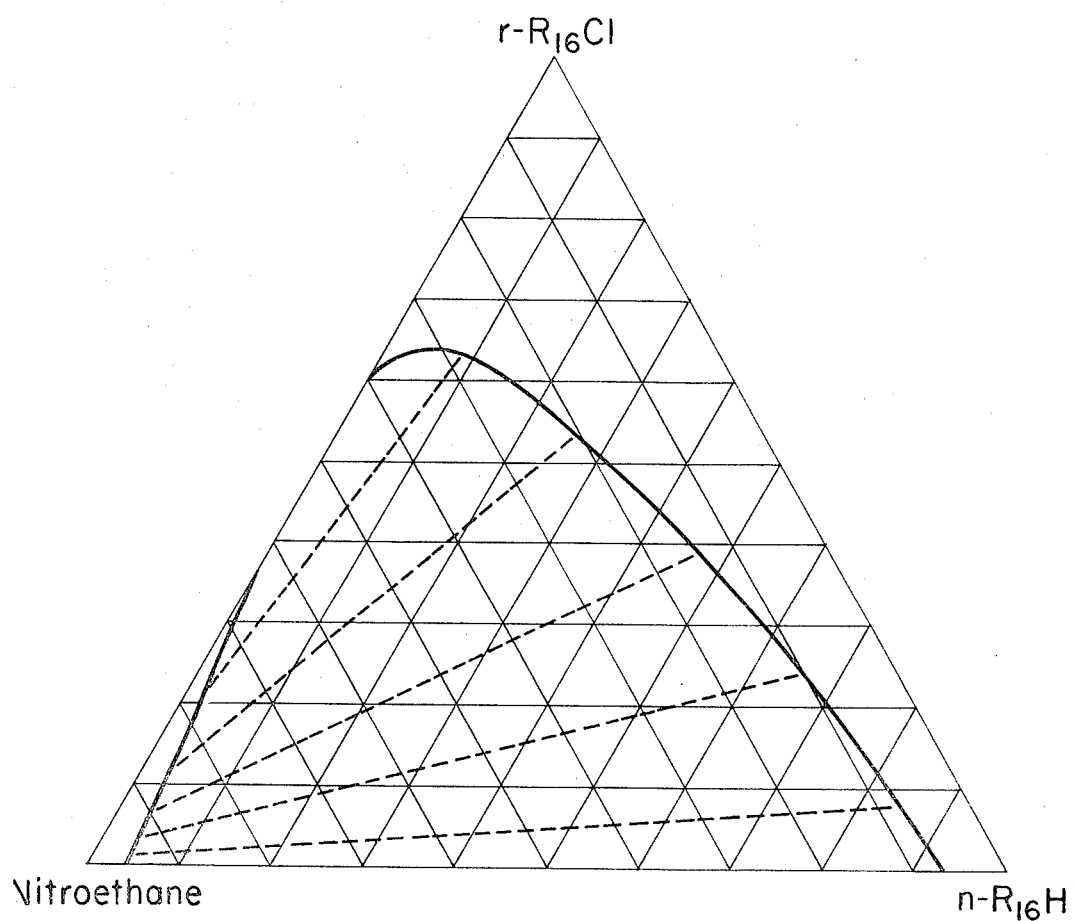
Figure 3:
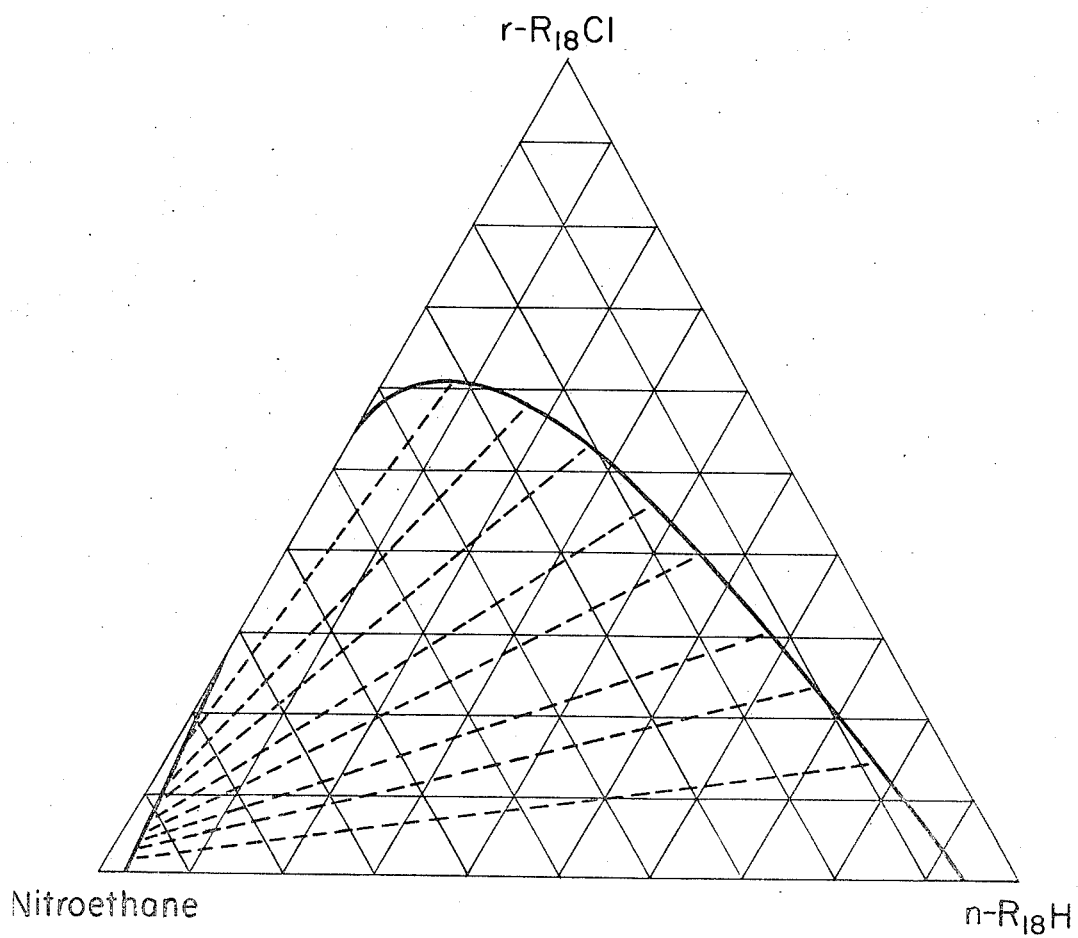

Many of the advantages of this invention can be recognized by reference to the accompanying drawings in which FIG. 1 is a phase equilibrium diagram for the system of random hexadecyl monobromide, hexadecane, and nitroethane at 28° C. and one atmosphere; FIG. 2 is a phase equilibrium diagram for the system of random hexadecyl monochloride, hexadecane and nitroethane at 35° C. and one atmosphere; FIG. 3 is a phase equilibrium diagram for the system of random octadecyl monochloride, octadecane and nitroethane at 35° C. and one atmosphere.

SUMMARY OF THE INVENTION

Broadly stated, the process of this invention comprises the step of mixing a solvent selected from the group consisting of propionitrile, nitroethane, and mixtures of acetone and methanol having ratios of acetone to methanol of from about 2:1 to about 9:1 with a mixture of alkanes and alkyl monohalides wherein said monohalides are selected from the group consisting of chlorides and bromides and said alkanes and alkyl monohalides have chain lengths of from 12 to about 24 carbon atoms with the difference between the shortest and longest chain lengths being no greater than about six carbon atoms to form a raffinate phase rich in said alkane and an extract phase rich in said monohalides.

The alkanes of this invention can have chain lengths of from about 12 to about 24 carbon atoms so long as the difference in chain length between the longest and shortest chain lengths is no greater than about six carbon atoms and preferably the alkanes have chain lengths of from about 16 to about 20 carbon atoms. Alkanes having chain lengths shorter than about 12 carbon atoms can be readily separated from their corresponding alkyl monohalide derivatives more economically by distillation than by solvent extraction. Alkanes having chain lengths greater than about 24 carbon atoms do not have a sufficiently different solubility from the corresponding alkyl monohalides to permit an economical extraction process. The alkanes of this invention are preferably straight chain alkanes. This is desirable since the resulting alkyl halides can be converted to straight chain surfactants that are readily biodegradeable. Suitable alkanes include dodecane, tridecane, tetradecane, pentadecane, hexadecane, heptadecane, octadecane, nonadecane, eicosane, uncosane, docosane, tricosane, and tetracosane. Other alkanes which can be used include, for example, 4-methyl pentadecane, 2-hexyloctane and 4-methyl nonadecane.

The alkyl monohalides of this invention are the monochloro and monobromo derivatives of the above alkanes. The alkyl monohalide can constitute from about 2% to about 90%, preferably 10% to 70%, on a mole basis, of the mixture of alkane and alkyl monohalide. The randomly halogenated derivatives are readily prepared in good yield by conventional techniques. The alkyl monochlorides are especially preferred for economic reasons. Polyhalogenated alkanes may also be present in the mixture in small amounts since the polyhalogenated alkanes can also be separated from the alkanes by the process of this invention. It is preferred, however, that the amount of polyhalogenated alkanes be kept to a minimum, since polyhalogenated alkanes are not desired for many applications and it is difficult to separate the mono- and polyhalogenated alkanes. The halogenation process is not critical to the practice of this invention. Any suitable halogenation process may be used such as those disclosed in: The Chemistry of Petroleum Hydrocarbons, vol. 3, Brooks et al., pp. 59–67, Reinhold (1955); The Encyclopedia of Chemical Technology, vol. 7, 1st edition, Kirk and Othmer, pp. 358–361 and 602–623, The Interscience Encyclopedia, Inc. (1951); Unit Processes in Organic Synthesis, 5th edition, Groggins, McGraw-Hill Book Co. (1958); British Pat. 969,104; and Belgian Pat. 501,638. These disclosures are incorporated herein by reference.

The solvents of the invention, as described hereinbefore, are propionitrile, nitroethane, and mixtures of acetone and methanol having ratios of acetone to methanol of from about 2:1 to about 9:1, preferably from about 3:1 to about 6:1. At ratios of acetone to methanol below about 2:1, solubility of the alkyl halide in the solvent is to small to permit economical separation even though selectivity increases. The preferred solvent is nitroethane because of the good differences in density between the two phases, the ease of coalescence, cost, handling, etc. The above solvents are unique in providing the proper characteristics for a suitable liquid extraction process for mixtures of alkyl monohalides and the corresponding alkanes.

The temperature of the process can be anywhere between the melting point of the alkane and the temperature where the solubility relationships do not permit the desired degree of separation. The upper temperature is determined by the desired purity of the alkyl monohalide. An operating temperature a few degrees below the consolute temperature of the alkyl monohalide with the solvent would have to be used if a purity approaching 100% alkyl monohalide is desired. The temperature at which the extraction process is carried out is normally between about −5° C. and about 65° C. preferably between 15° C. and 45° C. and most preferably between about 25° C. and about 35° C. The lower temperature limits are set by the solidification temperature of the alkane and the degree of solubility of the alkyl halide in the solvent.

An advantage of this process is that it permits one to carry out the extraction process near ambient temperatures and at atmospheric pressure. However, other pressures can be used and when higher temperatures are used with the mixture of methanol and acetone it is desirable to operate under increased pressure.

The steps which are taken in the solvent extraction of one material from another are well known in the art. Examples of suitable extraction processes for this invention can be found in Treybal, R. E., "Liquid Extraction," McGraw-Hill Book Publishing Company, Inc., New York, N.Y., 1963; Alders, L., "Liquid-Liquid Extraction," Elsevier Publishing Company, Amsterdam 1959; and Harris, D. K., Vashist, P. N., and Beckmann, R. B., "Liquid-Liquid Extraction," Industrial and Engineering Chemistry, volume 58, No. 11, pages 97–103 (November 1966). A description of equipment which can be used in these solvent extraction processes can be found in Akell, R. B., "Extraction Equipment Available in the United States," Chemical Engineering Progress, volume 62, No. 9, pages 50–55 (September 1966); Reman, G. H., "Extraction Equipment Outside the United States," Chemical Engineering Progress, volume 62, No. 9, pages 56–61 (September 1966) and U.S. Pat. 2,850,362, E. G. Scheibel (Sept. 2, 1958). All of these books, patents and articles and the works cited therein are incorporated herein by reference. The solvent extraction process of this invention is suitable for use in continuous, multi-stage extraction operations.

The solvent recovery step can be carried out using conventional distillation equipment. It is preferred to keep the distillation temperature and residence time as low as possible in order to avoid decomposition of the alkyl halides. Vacuum distillation is preferred so as to keep the distillation temperature low. It is preferred that the distillation temperature be kept below 150° C.

A preferred method of operation involves a solvent recovery system wherein one cools the extract phase to split the extract phase into a haloparaffin phase containing a small amount of solvent and a solvent phase containing only small amounts of alkyl monohalides. The solvent phase is recycled into the column. The haloparaffin phase (i.e. alkyl monohalide phase) is then divided into two portions having a weight ratio of from about 25:1 to about 50:1, e.g., 30:1, and the large portion is recycled back as reflux to the extraction equipment. The smaller portion is stripped of its solvent and is the product.

The invention can be better understood by reference to the following examples.

Example I 5.9412 g. of a mixture of randomly brominated hexadecane and hexadecane containing 20% randomly brominated hexadecane were mixed with 20.7786 g. of technical grade nitroethane and the mixture was allowed to come to equilibrium at 25° C. Two phases were separated, weighed and analyzed. The upper (raffinate) phase weighed 5.1246 g. and contained 7% nitroethane, 14.9% randomly brominated hexadecane, and 78.1% hexadecane. On a solvent-free basis, the raffinate phase contained 15% randomly brominated hexadecane.

The lower (extract) phase weighed 21.3273 g. and had a composition of 95.5% nitroethane, 2.9% hexadecane, and about 1.6% randomly brominated hexadecane. On a solvent-free basis the extraction phase contained 36.5% randomly brominated hexadecane as compared with 15% in the raffinate phase.

Example II 7.4308 g. of a 60% by weight solution of randomly chlorinated hexadecane in hexadecane was mixed with 18.8980 g. of technical grade nitroethane and allowed to come to equilibrium at 25° C. The upper (raffinate) phase was separated, weighed and analyzed. This raffinate phase weighed 6.5807 g. and had a composition of 12.8% nitroethane, 38.7% hexadecane, and 48.3% randomly chlorinated hexadecane. The percent of randomly chlorinated hexadecane in the raffinate phase, on a solvent-free basis, was 55.4%.

The lower (extract) phase weighed 19.7433 g. and had a composition of about 91.0% nitroethane, 2.28% hexadecane, and 6.67% randomly chlorinated hexadecane. The percent of randomly chlorinated hexadecane in the extraction phase, on a solvent-free basis, was 74.5% as compared with 55.4% in the raffinate phase.

Example III 7.9123 g. of 70% randomly chlorinated octadecane in octadecane were mixed with 13.9117 g. of technical grade nitroethane at 35° C. The phases were separated after equilibrium was established. The upper (raffinate) phase weighed 7.8774 g. This raffinate phase had a composition of 20.2% nitroethane, 25.8% octadecane, and 59% randomly chlorinated octadecane. The percent of randomly chlorinated octadecane in the raffinate phase on a solvent-free basis was 67.8%.

The lower (extract) phase weighed 13.9322 g. and had a composition of 89.1% nitroethane, 2.13% octadecane, and 8.77% randomly chlorinated octadecane. The percent of randomly chlorinated octadecane in the extract phase on a solvent-free basis was approximately 80.5% as compared with the 67.8% of randomly chlorinated octadecane in the raffinate phase.

EXAMPLE IV 8.0 g. of a 20% solution of randomly chlorinated hexadecane in hexadecane were mixed with 16.12 g. of technical grade propionitrile and allowed to come to equilibrium at 25° C. The lower (raffinate) phase weighed 6.9863 g. and had a composition of 7% propionitrile, 77.2% hexadecane, and 15.8% randomly chlorinated hexadecane. The percent of the randomly chlorinated hexadecane in the raffinate phase on a solvent-free basis was 17%.

The upper (extract) phase weighed 17.1160 g. and had a composition of 91.5% propionitrile, 5.53% hexadecane and 2.97% randomly chlorinated hexadecane. The percent of randomly chlorinated hexadecane in the extraction phase on a solvent-free basis was 35% as compared with the 17% of randomly chlorinated hexadecane in the raffinate phase.

EXAMPLE V 8.256 g. of a 20% solution of randomly chlorinated hexadecane in hexadecane were mixed with 16.8196 g. of a mixture of 20% technical grade methanol and 80% technical grade acetone. The mixture was allowed to come to equilibrium at 25° C. The amount of randomly chlorinated hexadecane in the upper (raffinate) phase and the lower (extract) phase on a solvent-free basis were found to be 17.58% and 28.4% respectively.

In each of the above examples the percentage of the alkyl halide in the extract is greater relative to the amount of alkane in the extract than was the amount of alkyl halide in the feed as compared to the amount of alkane in the feed.

When in the above examples the following mixtures of monohalogenated alkanes and alkanes are substituted for, e.g., the randomly chlorinated hexadecane and the hexadecane, substantially equivalent results are obtained in that an extraction phase is obtained which is enriched in monohalogenated alkane: randomly brominated octadecane and octadecane, randomly chlorinated eicosane and eicosane, randomly brominated docosane and docosane, randomly brominated tetradecane and tetradecane, randomly chlorinated dodecane and dodecane, a 50:50 mixture of octadecane and eicosane which has been monochlorinated to provide 20% monoalkyl chlorides, 7-bromoheptadecane and heptadecane and 2-chlorohexadecane and hexadecane.

All percentages, ratios and parts herein are by weight unless otherwise stated.

What is claimed is:

1. A process for separating mixtures of long chain alkyl monohalides from the corresponding alkanes wherein the halides are selected from the group consisting of chloride and bromide and said alkanes and alkyl monohalides have chain lengths of from 12 to about 24 carbon atoms, with the proviso that when alkyl monohalides and alkanes having a range of chain lengths are persent together in the mixture, the difference between the longest and shortest chain lengths in said mixture shall be no greater than about six carbon atoms, comprising the steps of mixing nitroethane with said mixture of alkanes and alkyl monohalides, allowing the mixture to come to equilibrium forming a raffinate phase and a nitroethane extract phase, separating the raffinate phase, rich in alkanes, from the nitroethane extract phase, rich in alkyl monohalides.

2. The process of claim 1 wherein said alkyl monohalides and alkanes contain from about 16 to 20 carbon atoms.

3. The process of claim 1 wherein said alkyl monohalide is an alkyl monochloride.

4. The process of claim 1 wherein said alkyl monohalide is an alkyl monobromide.

5. The process of claim 1 wherein the temperature of the process is between about $-5°$ C. and about $65°$ C.

6. The process of claim 1 comprising the additional step of cooling the extract phase to split the extract phase into an alkyl monohalide phase containing a small amount of solvent and a solvent phase containing only small amounts of alkyl monohalides, the solvent phase being recycled to the original process.

7. A process for separating mixtures of long chain alkyl monohalides from the corresponding alkanes wherein the halide is selected from the group consisting of chloride and bromide and said alkanes and alkyl monohalides have chain lengths of from about 12 to about 24 carbon atoms, with the proviso that when alkyl monohalides and alkanes having a range of chain lengths are present together in a mixture the difference between the longest and shortest chain lengths in said mixture shall be no greater than about six carbon atoms, comprising the steps of mixing a solvent system consisting of acetone and methanol having a ratio of acetone to methanol of about 2:1 to 9:1 with said mixture of alkanes and alkyl monohalides, allowing the mixture to come to equilibrium forming a raffinate phase and an acetone-methanol extract phase, separating the raffinate phase, rich in alkanes, from the acetone-methanol extract phase rich in alkyl monohalides.

References Cited

UNITED STATES PATENTS 3,349,008  10/1967  Vives _____ 260—652PUX

OTHER REFERENCES

Weissberger: Tech. of Org. Chem., Interscience Publishing Corp., New York, vol. IV, (1951), p. 338.

HOWARD T. MARS, Primary Examiner